(12) United States Patent
Starke et al.

(10) Patent No.: US 9,340,274 B2
(45) Date of Patent: May 17, 2016

(54) IMPACT PROTECTION PLATE FOR VEHICLES

(75) Inventors: Peter Starke, Ottobrunn (DE); Michael Fischer, Stepperg (DE); Martha Wachinger, Oberding (DE)

(73) Assignee: EADS Deutschland GmbH, Ottobrunn (DE)

( * ) Notice: Subject to any disclaimer, the term of this patent is extended or adjusted under 35 U.S.C. 154(b) by 627 days.

(21) Appl. No.: 13/469,325

(22) Filed: May 11, 2012

(65) Prior Publication Data

US 2012/0299331 A1 Nov. 29, 2012

(30) Foreign Application Priority Data

May 12, 2011 (DE) .......................... 10 2011 101 303

(51) Int. Cl.
*B64C 1/12* (2006.01)
(52) U.S. Cl.
CPC ....................................... *B64C 1/12* (2013.01)
(58) Field of Classification Search
CPC ............... B64G 1/58; B64G 1/56; B64C 1/12
USPC .......................... 244/121, 159.1, 159.2, 171.7
See application file for complete search history.

(56) References Cited

U.S. PATENT DOCUMENTS

| | | | | |
|---|---|---|---|---|
| 2,262,606 A | * | 11/1941 | Hardman | ................... 244/123.12 |
| 4,979,281 A | * | 12/1990 | Smith et al. | ................. 29/525.11 |
| 7,063,763 B2 | | 6/2006 | Chapman, Jr. | |
| 7,721,996 B2 | * | 5/2010 | Gehrett et al. | ................. 244/132 |
| 2005/0281987 A1 | | 12/2005 | Starke | |
| 2009/0047482 A1 | * | 2/2009 | Starke | ........................ 428/182 |
| 2009/0283635 A1 | * | 11/2009 | Gerken et al. | ............. 244/117 R |
| 2010/0282904 A1 | * | 11/2010 | Kismarton | ............ B29C 70/342 244/119 |

FOREIGN PATENT DOCUMENTS

| | | |
|---|---|---|
| DE | 10 2007 038 634 B3 | 7/2008 |
| EP | 0 351 565 A2 | 1/1990 |
| FR | 2 537 502 A1 | 6/1984 |

OTHER PUBLICATIONS

Kevlar Aramid Fiber, Aug. 2007, Dupont, pp. II-1 and II-2.*
European Search Report dated Aug. 31, 2012 (seven (7) pages).

* cited by examiner

*Primary Examiner* — Brian M O'Hara
(74) *Attorney, Agent, or Firm* — Crowell & Moring LLP

(57) ABSTRACT

An impact protection plate is provided for mounting on the structure of an aircraft. The impact protection plate includes a first layer, close to the aircraft, made of a fiber-reinforced plastic having a wave-shaped pattern of alternating elevations and depressions, the transverse tensile strength of the fiber-reinforced plastic being greater than 50 MPa. The impact protection plate includes a second layer situated on the first layer, remote from the aircraft, and is made of a fiber-reinforced plastic, the elongation at break of the reinforcement fibers being greater than 3%.

8 Claims, 3 Drawing Sheets

IMPACT PROTECTION PLATE FOR VEHICLES

BACKGROUND AND SUMMARY OF THE INVENTION

Figure 1:
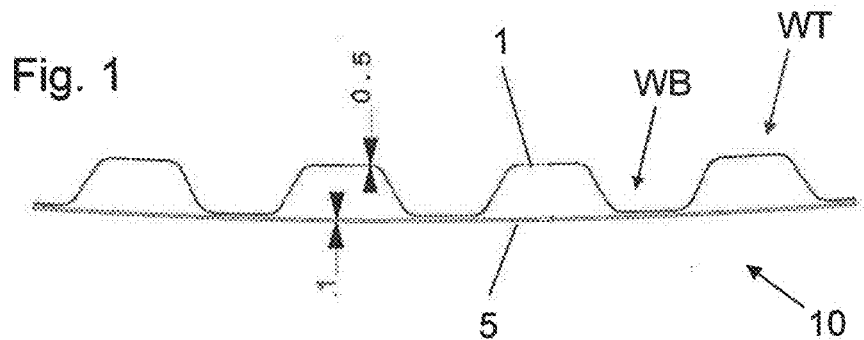

The present application claims priority under 35 U.S.C. §119 to German Patent Application No. 10 2011 101 303.6, filed May 12, 2011, the entire disclosure of which is herein expressly incorporated by reference.

Exemplary embodiments of the present invention relate to an impact protection plate for mounting on the structure of a vehicle, in particular an aircraft.

Military transport aircraft, for example, the C160 Transall, are being increasingly used for humanitarian aid and disaster relief operations in crisis areas. In carrying out these operations, landings on unpaved runways are not uncommon, since the infrastructure in the affected countries, in particular in the region of the takeoff and landing strips, is often inadequately developed. These outlandings result in increased stone chip damage to the underside of the fuselage and to the antennas and valves located there. Stone chips to the antennas often have adverse effects on flight safety since proper functionality of navigation and radio devices may no longer be ensured due to the damage. In addition, these stone chips often result in high repair costs. For flights under icy conditions, propeller aircraft are also endangered by the impact of pieces of ice which come loose from the propeller.

German Patent Publication No. DE 10 2007 038 634 B3 describes an impulse-absorbing component as part of the structure of an aircraft, having a first wave-shaped, impulse-absorbing layer and a smooth cover layer situated thereon. The material of the wave-shaped layer is selected in such a way that it has a higher elongation at break than the cover layer. If a mass impact occurs and the outer cover layer is punctured, an intercept bag forms from the wave-shaped layer to dissipate the kinetic energy of the mass.

Exemplary embodiments of the present invention provide impact protection for a vehicle, in particular an aircraft, by means of which damage by stone chips, propeller ice impact, etc. may be reliably avoided, so that in particular the operational safety is not impaired, and the maintenance and repair effort for the vehicles affected by stone chip damage may be reduced.

The forces and energies that occur with stone chips (in the case of an aircraft, in particular during takeoff and landing) or propeller ice impact may be well absorbed and elastically cushioned by use of the impact protection plate according to the invention. The cushioning effect is achieved in particular by the wave-shaped layer close to the aircraft, which also has good rigidity. The impact protection plate according to the invention thus represents a type of "crumple zone" for impacting masses.

Since the critical region for stone chips on an aircraft is located in particular on the underside of the fuselage, one or more impact protection plates is/are preferably situated in this region of the aircraft fuselage. To protect from propeller ice impact, the impact protection plate is mounted in particular on the aircraft fuselage in the region of the propeller level.

Besides transport or passenger aircraft, an aircraft may also involve so-called unmanned aerial vehicles (UAVs). In addition to use on aircraft, the impact protection plate according to the invention may be used for protection of other vehicles that are subject to impact from masses, such as all-terrain vehicles, trucks, and railroad trains.

The impact protection plate according to the invention reduces repair costs for the vehicle and decrease the down times for the vehicle. The impact protection plate has very good impact-absorbing properties, with a very low weight.

The impact protection plates according to the invention may be mounted on existing vehicles without major modifications.

The impact protection plate according to the invention has the following layer structure in particular:

First Layer Close to the Vehicle (Also Referred to as "Wave Profile" Below):

This layer is composed of a fiber-reinforced plastic, and has a wave-shaped cross section with a regular pattern of alternating elevations and depressions. The transverse tensile strength of the fiber-reinforced plastic is greater than 50 MPa. The transverse tensile strength is the tensile strength of the material in the direction perpendicular to the reinforcement fibers. This transverse tensile strength is a good measure of the quality of the fiber/matrix binding within the fiber-reinforced plastic material. The selected parameter range ensures that the integrity of the layer, and thus the sought elastic effect, of this layer is maintained even under high stress from impacts. The individual elevations and depressions may in particular have a trapezoidal shape, although other shapes are also possible. The wave structure of this layer has the additional advantage that good ventilation of the interspace between the impact protection plate and the outer skin of the vehicle is ensured, so that corrosion processes at this location are prevented or at least impeded.

Second Layer Remote from the Vehicle (Also Referred to as "Cover Layer" Below):

This second layer is provided on the first layer as a cover layer. The second layer is a smooth layer having a curvature that is preferably adapted to the curvature of the aircraft structure. The second layer likewise is composed of a fiber-reinforced plastic, the elongation at break of the reinforcement fibers being greater than 3%. As a result of the high elongation at break, failure of this cover layer under the expected stresses due to impacts may be avoided with high reliability.

In one preferred embodiment, the elongation at break of the reinforcement fibers of the second layer is higher than the elongation at break of the reinforcement fibers of the first layer.

The selection of the layer thicknesses is made according to the application. In most cases, the thickness of the wave profile is less than the thickness of the cover layer. Preferred thickness ranges are as follows:

Wave profile: between 0.4 mm and 0.8 mm
Cover layer: between 0.9 mm and 2.0 mm

For the wave profile, the following combinations of fiber and matrix may be used in a particularly advantageous manner:

E-glass/PEEK
E-glass/PPS
E-glass/epoxy
S2-glass/PEEK
S2-glass/PPS
S2-glass/epoxy
Quartz glass/PEEK
Quartz glass/PPS
Quartz glass/epoxy For the cover layer, the following combinations of fiber and matrix are particularly suited:

S2-glass/PEEK
S2-glass/PPS
S2-glass/epoxy
Quartz glass/PEEK
Quartz glass/PPS

Quartz glass/epoxy
Aramide/PEEK
Aramide/PPS
Aramide/PE
Aramide/PP

One particularly advantageous embodiment of the impact protection plate according to the invention has S2-glass/epoxy as material for both layers.

In particular for the variants containing epoxy resin matrix, the so-called VAP resin injection process, as described in European Patent Publication No. EP 1 181 149 B1, for example, is suitable as a manufacturing method. In this process, the component space defined by the outer vacuum film is divided into two subspaces by a membrane which is permeable to air but impermeable to resin.

BRIEF DESCRIPTION OF THE DRAWING FIGURES

Figure 2:
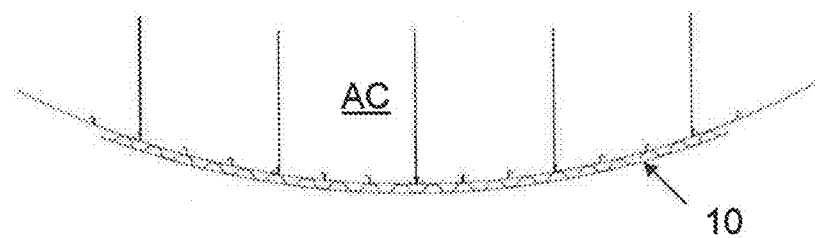
Figure 3:
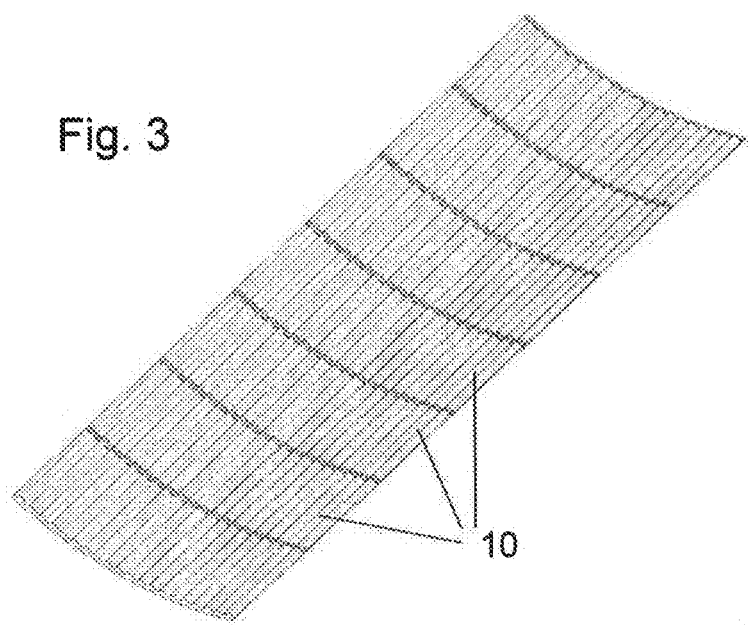
Figure 4:
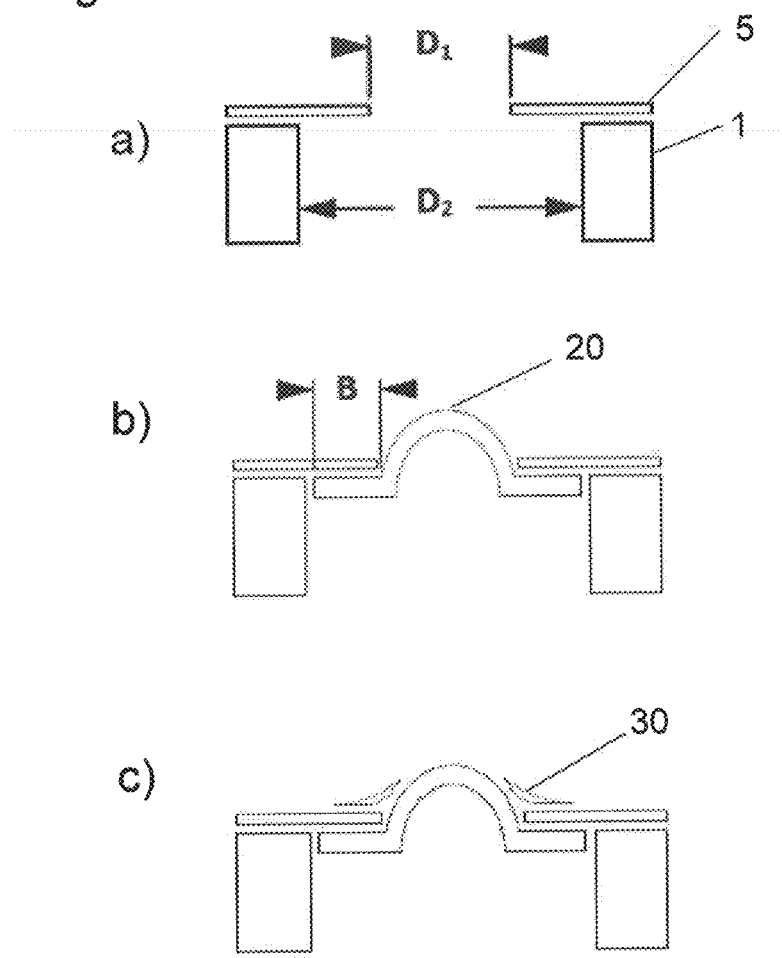
Figure 5:
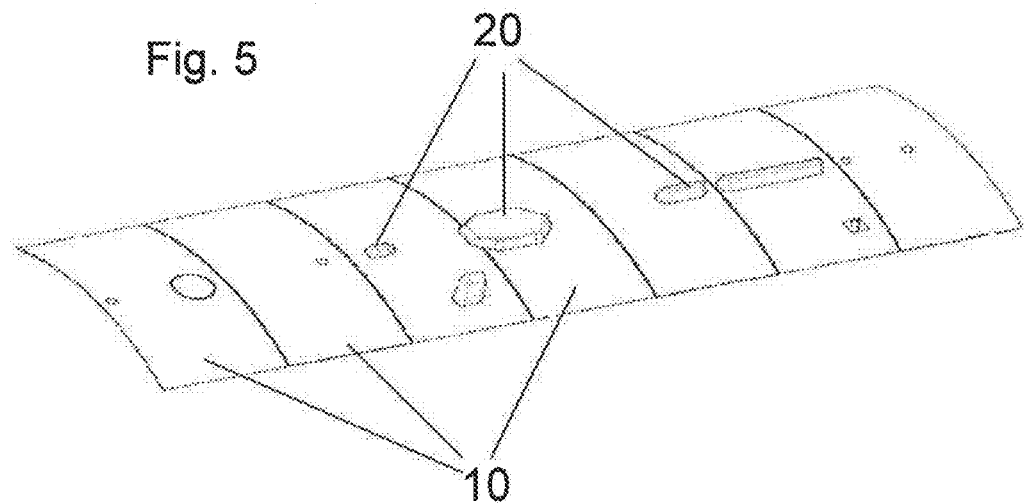
Figure 6:
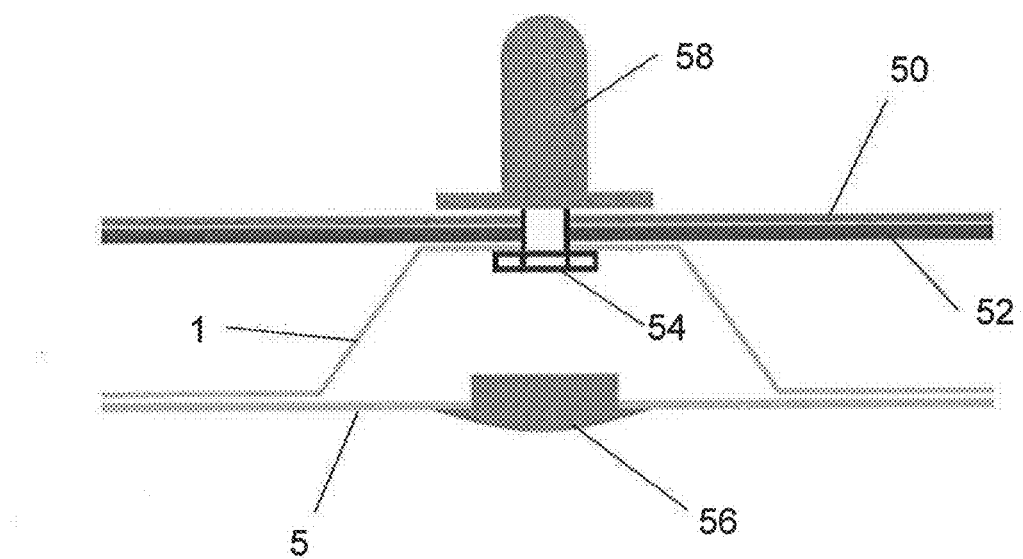

The invention is explained in greater detail below based on specific exemplary embodiments, with reference to the figures, which show the following:

FIG. 1 shows a cross section of an impact protection plate according to the invention, FIG. 2 shows an impact protection plate according to the invention on the fuselage of an aircraft, FIG. 3 shows a combination of multiple impact protection plates according to the invention, FIGS. 4a)-4c) show an illustration of the details for fastening an additional protective cover at a recess in the impact protection plate according to the invention, FIG. 5 shows an impact protection plate according to the invention having multiple protective covers, and FIG. 6 shows an illustration of the details for fastening an impact protection plate according to the invention to the fuselage of an aircraft to be protected.

DETAILED DESCRIPTION

FIG. 1 shows the cross section of an impact-absorbing impact protection plate 10 according to the invention, which is provided for mounting to the underside of the fuselage of an aircraft. Apparent is the first layer 1 close to the aircraft, designed as a wave profile having regular trapezoidal wave troughs WT and wave crests WB in one direction (the designation as wave troughs and wave crests is made from the viewpoint of an observer on the aircraft side). The outer (i.e., facing toward the expected stone chips) cover layer 5 is situated on the wave profile 1. In the example shown, the wave profile 1 has a thickness of 0.5 mm, while the cover layer 5 has a thickness of 1.0 mm. The illustrated impact protection plate has a curvature conforming to the contour of the underside of the fuselage of the aircraft to be protected. FIG. 2 shows the corresponding impact protection plate 10 on the fuselage of the aircraft AC.

FIG. 3 shows a three-dimensional illustration of multiple impact protection plates 10 that are combined into a panel. The illustrated panel forms the stone chip protection for the aircraft. The subdivision into multiple subpanels results in particular from the manufacturing process, and in principle may be arbitrarily selected. In addition, the criterion for fairly small plates for better handling during installation is important here. For aerodynamic optimization, the cover layers may overlap at the connecting regions.

The extensions (in particular antennas and valves) present on the underside of the fuselage represent obstacles for the impact protection plate according to the invention. The plate is therefore provided with recesses having protective covers 20 (FIGS. 4a)-c) and 5) in order to cover and protect the extensions located in the recesses. The same materials that may be used for the two layers 1 and 5, for example thermoplastic materials having glass fibers as reinforcement, are suitable as materials for the protective cover. Since these are nonconductive materials, problems with electromagnetic radiation from the antennas are avoided. FIGS. 4a)-4c) show details concerning the configuration and fastening of the protective covers. Quartz glass is particularly suited as a material for the protective covers due to its particularly good electromagnetic properties. In further advantageous embodiments, in particular the impact protection plates situated in the vicinity of antennas may be made of quartz glass, while the plates situated farther away may be made from the other mentioned matrix materials, which are usually less expensive.

To allow a protective cover 20 to be fastened to the cover layer 5, the recess in the cover layer 5 is selected to be smaller than in the wave profile 1 (D1<D2 in FIG. 4a). The protective cover 20 is inserted through the cover layer from the inside (on the aircraft side), and is adhesively bonded to the underside (side facing the aircraft) of the cover layer 5, specifically, over the entire or partial area of the overlap region B (FIG. 4b). The difference in diameters D1, D2 prevents the protective cover from falling off the aircraft in the event that the adhesive bond fails.

As additional securing of the protective cover 20, as illustrated in FIG. 4c a circumferential thermoplastic weld connection 30 may be present on the outer side (side facing away from the aircraft) of the cover layer 5 along the joint between the protective cover 20 and the cover layer 5. This thermoplastic weld connection not only ensures better load-bearing performance of the cover layer 5/protective cover 20 connection, but at the same time also provides a seal for the joint.

In addition, screw or rivet connections, in particular made of thermoplastic material, may be used for fastening the protective covers.

FIG. 5 shows the stone chip protection for the aircraft formed from plates 10 according to the invention, having multiple (a total of 11) recesses with associated protective covers 20 for covering the antennas and valves situated thereebeneath. It is also apparent that the recesses may also extend over multiple impact protection plates 10.

FIG. 6 shows the design of the fastening via which the impact protection plate is mounted on the aircraft fuselage. For introducing the forces into the aircraft hull composed of frames and stringers (not illustrated in FIG. 6), additional double sheets 52 are mounted on the aircraft paneling 50. These are sheet metal strips approximately 1 mm thick which are fastened to the outer skin of the aircraft by countersunk rivets. The double sheets extend either between two stringers or between two frames. In principle, the double sheets 52 may be mounted on the outer as well as the inner side of the paneling. In the embodiment shown in FIG. 6, the double sheets are mounted on the outer side of the paneling 50. In addition, elastic surface materials, for example a foam rubber layer (not illustrated in FIG. 6), may be situated on the double sheets to balance out unevenesses and to prevent increased friction between the double sheet 52 and the wave profile 1. The impact protection plate is fastened by screws 54 situated in the region of a wave trough. The cover layer 5 thus also acts as protection of the screw connection from external influences. If an external impact to the screw head should nevertheless occur, this embodiment ensures that the lever arm for introduction of force into the aircraft structure is relatively short, and the introduction of force is correspondingly low (compared to the attachment of the screws at the wave crests).

The cover layer 5 must be provided with a borehole to ensure access to the screws 54 from the outside. This borehole must be large enough to allow insertion of the tool necessary for tightening the screw 54. These boreholes are closed by rubber covers 56 after the impact protection plate is installed. Pressure-tight plate nuts 58 are used for the screw connection in order to maintain the pressure in the aircraft interior. These plate nuts ensure that the paneling is leak-tight when the impact protection plate is installed. The plate nuts are mounted in the aircraft interior, and may be fastened to the paneling using two countersunk rivets.

By using the described fastening concept, the stone chip protection plates may be mounted to the aircraft in a rapid and flexible manner and removed as needed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

ABBREVIATIONS

PEEK: Polyether ether ketone
PPS: Polyphenylene sulfide
PE: Polyethylene
PP: Polypropylene

What is claimed is:

1. An impact protection plate, comprising:
   a first layer, configured for mounting close to a vehicle, made of a fiber-reinforced plastic having a wave-shaped pattern of alternating elevations and depressions, the transverse tensile strength of the fiber-reinforced plastic being greater than 50 MPa; and
   a second layer situated on a side of the first layer remote from the vehicle, wherein the second layer is made of a fiber-reinforced plastic, an elongation at break of reinforcement fibers of the fiber-reinforced plastic being greater than 3%,
   wherein the reinforcement fibers of the second layer have a higher elongation at break than reinforcement fibers of the fiber-reinforced plastic of the first layer.

2. The impact protection plate according to claim 1, wherein a thickness of the first layer is in a range between 0.4 mm and 0.8 mm, and a thickness of the second layer is in a range between 0.9 mm and 2.0 mm.

3. The impact protection plate according to claim 1, wherein the impact protection plate is fastened to a structure of the vehicle in a region of wave troughs of the first layer, viewed from the direction of the vehicle structure.

4. The impact protection plate according to claim 3, wherein the second layer includes an opening in flush alignment with a location of the fastening to the vehicle structure, to allow access to the fastening from outside of the impact protection plate.

5. The impact protection plate according to claim 4, wherein the opening is closed by an elastic cover.

6. The impact protection plate according to claim 1, wherein the impact protection plate has recesses for extensions on a structure of the vehicle.

7. The impact protection plate according to claim 6, wherein the recesses are covered by protective covers fastened by an adhesive connection at a side of the second layer facing the vehicle.

8. The impact protection plate according to claim 7, wherein a circumferential thermoplastic weld connection is on a side of the second layer facing away from the vehicle, along a joint between the protective cover and the second layer.

* * * * *